United States Patent [19]

Schmidt

[11] 4,364,163
[45] Dec. 21, 1982

[54] METHODS FOR MOUNTING CONNECTION WIRES ON A SOLID ELECTROLYTE CAPACITOR

[75] Inventor: Hans Schmidt, Barcelona, Spain

[73] Assignee: Componentes Electronicos, S.A., Barcelona, Spain

[21] Appl. No.: 122,056

[22] Filed: Feb. 15, 1980

[30] Foreign Application Priority Data

Feb. 20, 1979 [FR] France .................................. 79 04247

[51] Int. Cl.$^3$ .......................... H01G 9/00; H01G 9/24
[52] U.S. Cl. .................................... 29/570; 361/433; 29/855
[58] Field of Search ................ 29/570, 854, 855, 860; 361/433

[56] References Cited

U.S. PATENT DOCUMENTS 3,264,708  8/1966  Diggens .......................... 29/570 X
3,349,294 10/1967  Heinimann et al. ................ 361/433
4,155,156  5/1979  Assman et al. .................... 29/570 X

FOREIGN PATENT DOCUMENTS 30024  6/1981  European Pat. Off. ............. 29/854

Primary Examiner—L. Dewayne Rutledge
Assistant Examiner—Alan E. Schiavelli
Attorney, Agent, or Firm—Cushman, Darby & Cushman

[57] ABSTRACT

A tantalum capacitor comprising a cylindrical body and an axial tantalum anode wire. This wire is first folded and then soldered to an anode connection wire roughly parallel to a cathode connection wire which is itself soldered to the body of this capacitor. The connection wires include preferably a double right-angled section so that the distance between the outward portions of this wire correspond to predetermined standards.

4 Claims, 4 Drawing Figures

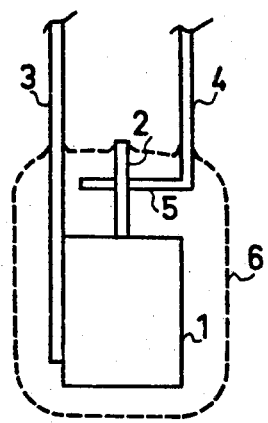
FIG_1
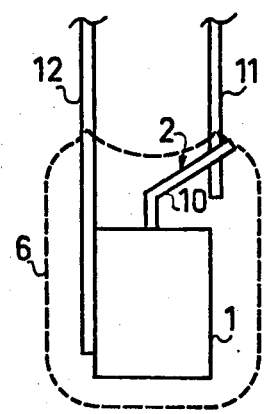
FIG_2
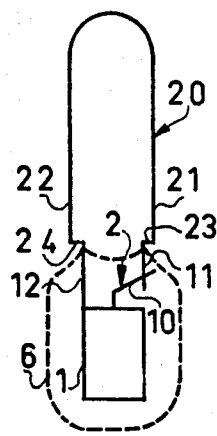
FIG_3
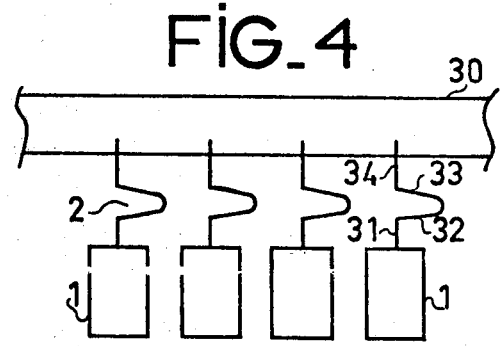
FIG_4

METHODS FOR MOUNTING CONNECTION WIRES ON A SOLID ELECTROLYTE CAPACITOR

FIELD OF THE INVENTION

The present invention relates to a method for mounting anode and cathode connection wires on a solid electrolyte capacitor and a tantalum capacitor obtained by this method.

DESCRIPTION OF THE PRIOR ART

The technique for manufacturing tantalum capacitors is well known. Generally, they consist of a cylindrical body with an external cathode layer surrounding an anode formed by a tantalum wire. This capacitor must be provided with connection wires one of which is soldered to the tantalum wire and the other to the outside of the cylindrical body. When the connection wires have been fixed, the capacitor is insulated by coating with resin or some other known insulating product.

A big difficulty in the fixing of the connection wires is due to the very small dimensions of the capacitor before coating. It is in the shape of a small cylinder whose diameter is currently between 1 and 6 mm and whose height is between 1 and 10 mm.

One of the manufacturing methods currently used in practice for fixing the connection wires consists in having these wires in the shape of hair-pins, the end of one arm of the pin being folded inwards crosswise towards the other arm of the pin. Thus, when the unfolded arm of the pin is mounted longitudinally with respect to the cylindrical body of the capacitor, the crosswise end of the other arm is perpendicular to the tantalum anode wire protruding from the center of the capacitor body. A solder connection is then made between two orthogonal wires (the connection wire and the tantalum wire). However, in practice, it appears that this method of assembly, which seems natural as it is simpler to solder together two orthogonal wires, or, in any case, wires not parallel one to the other, has several disadvantages. Among these may be cited the fact that, after coating, the portion of tantalum wire external to the capacitor which extends beyond the solder point with the anode connection wire may protrude outside the coating added at a later stage; there is then a risk of short-circuiting when the capacitor is mounted on a base. Another disadvantage of this method is due to the fact that, given the very small dimensions of a tantalum capacitor, the crosswise end of the connection wire intended to be used as anode connection wire may have a tendancy to touch the cathode connection wire soldered to the cylindrical body of the capacitor and, even if these wires do not touch really, their close proximity causes a risk of breakdown.

SUMMARY OF THE INVENTION

Hence, one object of the present invention is to provide a new method for mounting the anode and cathode connection wires on a solid electrolyte capacitor, this new method being simpler and avoiding the disadvantages mentioned above of previous practice.

The present invention also allows for a tantalum capacitor obtained by the above method.

To attain these objects among others, the present invention provides for a method for mounting the anode and cathode connection wires on a solid electrolyte capacitor, this capacitor being cylindrical in shape and having a roughly axial anode wire and a peripheral cathode surface, the method including the following main steps: folding the anode wire to start with to an angle of more than 45°; arranging the connection wires so that they are generally parallel one to the other and to the capacitor axis and that their length may be noticeably different from the capacitor height so that the first connection wire contacts the folded part of the anode wire and the second connection wire contacts the capacitor body along a roughly axial line in a radial zone opposite that towards which the anode wire is folded; soldering the connection wires to the anode and outside of the capacitor respectively; coating the capacitor to leave only the connection wires bare.

BRIEF DESCRIPTION OF THE DRAWINGS

These objects, characteristics and advantages as well as others of the present invention will be explained in more detail in the following description of preferred embodiments, the description being in connection with the figures attached among which:

FIG. 1 shows a tantalum capacitor mounted in accordance with a classical method of prior art;

FIG. 2 shows a tantalum capacitor mounted in accordance with the method of the present invention;

FIG. 3 shows a particular way of making the tantalum capacitor mounting in accordance with the present invention; and FIG. 4 is intended to illustrate one aspect of the present invention.

DESCRIPTION OF THE PREFERRED EMBODIMENTS

It is to be noted first of all on examining these various figures that they are in no way to scale and, for the various dimensions, reference is to be made to the indications in the present text. It is appropriate to stress the very small dimensions of the various elements. As has already been mentioned, the cylindrical body of the various capacitors may be as small as 1×1 mm, these dimensions may go up to 6×10 mm. The axial tantalum wire protruding from the capacitor body may have a diameter of the order of 0.2 to 9.35 mm and a length of a few mm. As for the connection wires, their diameter will usually be of the order of 0.4 to 0.6 mm. Thus, in an extreme case, the diameter of the connection wires is only about half that of the capacitor body.

FIG. 1 shows the typical assembly method of prior art. There is a capacitor body 1 from which a tantalum wire 2 protrudes. Connection wires 3 and 4 are added to this capacitor body. Cathode connection wire 3 is soldered, with the addition of material, to capacitor body 1 and anode connection wire 4 has a folded part 5 which is turned towards the central tantalum wire. Tantalum wire 2 and connection wire 4 are usually soldered without the addition of material. On this figure can be seen the two disadvantages already mentioned, i.e. after addition of an insulating coating 6, on the one hand, the upper end of tantalum wire 2 can protrude outside the coating and, on the other hand, the end part of the folded branch 5 of the anode connection wire can come into contact with cathode connection wire 3. It should again be recalled on this point that, if the capacitor diameter is of the order of a mm, this overhang of the end of folded branch 5 can be particularly dangerous as far as possible breakdowns are concerned. Also, sometimes in this technique this overhang of folded part 5 of anode connection wire 4 is presented as having the advantage of holding the drop of coating product better. In fact, this advantage is a pure illusion; with the dimensions concerned, the overhang cannot exceed a dimension of a few fractions of a mm to a few mm.

FIG. 2 shows a way of making a capacitor in accordance with the present invention. This capacitor, like the previous one, has a cylindrical body 1 from which a tantalum wire 2 protrudes. Tantalum wire 2 is folded and has an oblique or rounded part 10. Then, anode and cathode connection wires, 11 and 12 respectively, are added to the capacitor, the anode wire joining the end zone of tantalum wire 2 and the cathode wire being roughly along an axial line of the outside of the body of the capacitor diametrically opposite the direction towards which the tantalum wire is folded. This difference between the assembly method in the present invention and the method of prior art should not be considered as a simple reverse since it brings its own advantages by avoiding in particular the two disadvantages already mentioned of devices according to prior art. It may also be noted that, if the end of folded part 10 of tantalum wire 3 protrudes slightly outside the coating, this is less troublesome than in the case of prior art since this protrusion is on the side of the capacitor and not between the connection wires which, in the case of assembly on a plate, is particularly liable to cause a short-circuit.

FIG. 3 shows in a general way a device analogous to that of FIG. 2 in which the same elements are designated by the same references.

In FIG. 3 the connection wires are in the form of a hair-pin 20 with two branches 21 and 22, these branches ending in parts 11 and 12 already shown in part in FIG. 2. This way of mounting connections is more or less classical in capacitor manufacture technique. When the two branches of the pin have been soldered to the capacitor, the rounded part of the pin is cut to form two independant connection wires. It may be noted in particular that, between branches 21 and 22 and their respective end parts 11 and 12, double right-angled sections 23 and 24 are provided so that parts 11 and 12 are parallel one with the other and with branches 21 and 22 of pin 20 but are at a distance one from the other different from that between branches 21 and 22. Hence, branches 21 and 22 can be at a predetermined distance one from the other independantly of the dimensions of the capacitor by allowing double right-angled sections 23 and 24 of varying size either inwards or outwards. This makes it possible to standardize the connection pins on the one hand and, for the user, to have available equidistant pins no matter what the dimensions of the capacitor on the other.

After fixing the connection wires on the capacitor, a coating is then generally added. In a preferred embodiment this coating is obtained by using a fluidified bed technique, i.e. resin in powder form is arranged as a fluidified bed by means of air jets or some other suitable gas jets and a capacitor, fitted with its connection wires and preheated, is held by it connection wires and immersed in the fluidified bed so that particles adhere to the hot parts. The double right-angled section 23-24 in accordance with the present invention enables the depth to which the capacitor should be submerged to be seen better so that there are no resin adherences on parts 21 and 22 beyond the double right-angled section with respect to the capacitor.

FIG. 4 shows a stage in the manufacture of tantalum capacitors in accordance with the present invention.

During the industrial process of manufacture, several capacitors are mounted on a band 30, a metallic band for example, by bonding or soldering of their tantalum wire. Tantalum wire 2 will preferably be shaped from the start of the manufacturing stages in the way shown, i.e. with a first axial segment 31, followed by two folded parts 32 and 33 forming a V and a segment 34 along the continuation of first part 31. As is known, the various stages of manufacture of the capacitor include in particular stages of successive dipping in various baths to form body 1 and cover it with solder. In accordance with an advantage of the present invention, the first fold between segments 31 and 32 and the V 32–33 can be used as a mark to determine the depth to which the end of segment 31 must be submerged in a given bath. Then tantalum wire 2 is cut in the region of part 32 and mounting of the connection wires is done in the way previously described in dealing with FIGS. 2 and 3.

The present invention is not limited to the production methods which have been specifically described but includes the various variants and modifications accessible to those skilled in the art. In particular, it is not limited to tantalum capacitors but can be applied to other electrolytic capacitors with the same structure and also to other electrical components with the same structure in which there is a difficulty for fixing the connection electrodes.

Also, various variants of manufacture can be implemented. For example, in FIG. 4, the tantalum wires can be mounted on bands 30 before folding and folded automatically afterwards. Also, other methods of folding can be implemented as long as segments 31 and 32 exist; for example, segment 32 can be connected to band 30 by a single fold or even directly.

What I claim is:

1. A method for mounting anode and cathode connection wires on a solid electrolyte capacitor, said capacitor being cylindrical in shape with a roughly axial anode wire and a peripheral cathode surface, including the following steps:

folding the anode wire to an angle of more than 45°,
   arranging connection wires so that they are generally parallel one with the other and with the capacitor axis and that their length differs noticeably from the capacitor height so that the first connection wire contacts the folded part of the anode wire and the second connection wire contacts the capacitor body along an axial line in a radial zone opposite that to which the anode wire is folded,
   soldering the connection wires to the anode and capacitor periphery respectively,
   coating the capacitor so as to leave only the connection wires visible.

2. A method as in claim 1 wherein the connection wires are originally in the form of hair-pins whose round part is cut after these wires have been soldered on the capacitor.

3. A method as in claim 2 wherein the connection wires, in the part opposite the rounded end of the hair-pin, have a double right-angled section so that the distance between the two branches of the hair-pin is different towards the ends of the wires from that towards the rounded part of the hair-pin.

4. A method as in claim 1 wherein the coating is produced by immersion of a heated capacitor in a fluidified bed of resin powder.

* * * * *